(12) United States Patent
Barnett et al.

(10) Patent No.: US 6,468,483 B2
(45) Date of Patent: *Oct. 22, 2002

(54) PROCESS FOR TREATING ALUMINA-BEARING ORES TO RECOVER METAL VALUES THEREFROM

(75) Inventors: Robert J. Barnett, Goldendale, WA (US); Michael B. Mezner, Sandy, OR (US)

(73) Assignee: Goldendale Aluminum Company, Goldendale, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/847,205

(22) Filed: May 3, 2001

(65) Prior Publication Data

US 2001/0051121 A1 Dec. 13, 2001

Related U.S. Application Data

(63) Continuation-in-part of application No. 09/497,909, filed on Feb. 4, 2000, now Pat. No. 6,248,302.

(51) Int. Cl.[7] .................. C01G 49/00; C22B 21/00; C22B 34/00; C01B 33/12
(52) U.S. Cl. .................. 423/83; 423/81; 423/82; 423/85; 423/86; 423/132; 423/140; 423/150.1; 423/335
(58) Field of Search .................. 423/81, 82, 83, 423/85, 86, 121, 127, 132, 140, 141, 142, 150.1, 335

(56) References Cited

U.S. PATENT DOCUMENTS

| | | |
|---|---|---|
| 38,285 A | 4/1863 | Cobley |
| 1,519,880 A | 12/1924 | Specketer et al. |
| 1,873,348 A | 8/1932 | Smith |
| 1,873,642 A | 8/1932 | Guertler |
| 1,931,515 A | 10/1933 | Specketer et al. |
| 2,019,554 A | 11/1935 | Derr |
| 2,160,148 A | 5/1939 | Hunyady |

(List continued on next page.)

FOREIGN PATENT DOCUMENTS

| | | |
|---|---|---|
| AU | 100900 | 5/1937 |
| AU | 103549 | 4/1938 |
| AU | 223794 | 9/1959 |
| AU | 237278 | 1/1962 |

(List continued on next page.)

*Primary Examiner*—Steven Bos
(74) *Attorney, Agent, or Firm*—Andrew Alexander

(57) ABSTRACT

A method for processing alumina-bearing ores such as bauxite to recover iron, aluminum, silicon and titanium metal values therefrom the method comprising the steps of adding the alumina-bearing ores to a digester containing an acid to provide a mixture of acid and alumina-bearing ores and heating the mixture to dissolve soluble compounds of at least one of iron, aluminum, silicon and titanium to provide a digest containing dissolved salts of the soluble compounds and to provide a gas component. Thereafter, the digest is treated with water to dissolve water soluble salts therein to provide a slurry comprised of a liquid containing water and the dissolved soluble salts and a solid component comprised of silica. The solid component is separated from the liquid and the pH of the liquid is adjusted to form an aluminate and an iron-containing precipitate. The iron-containing precipitate is separated from the liquid to provide an iron-depleted liquid whose pH is adjusted to precipitate aluminum trihydrate which is separated from the iron-depleted liquid to provide an aluminum trihydrate-depleted liquid. The pH of the aluminum trihydrate-depleted liquid is adjusted to form a precipitate comprised of at least one remaining salt in the aluminum trihydrate-depleted liquid to provide a salt-depleted liquid. The salt precipitate is separated from the salt-depleted liquid thereby recovering the metal values from the alumina-bearing ores.

22 Claims, 1 Drawing Sheet

U.S. PATENT DOCUMENTS

| | | | | |
|---|---|---|---|---|
| 2,402,668 | A | 6/1946 | Roller | |
| 2,551,944 | A | 5/1951 | Haff | |
| 2,780,523 | A | 2/1957 | Gloss | |
| 2,830,892 | A | 4/1958 | Udy | |
| 2,951,743 | A | 9/1960 | Kretzschmar | |
| 3,007,774 | A | 11/1961 | Stokes et al. | |
| 3,079,228 | A | 2/1963 | Skay | |
| 3,185,545 | A | 5/1965 | Scott | |
| 3,216,792 | A | 11/1965 | Udy | |
| 3,240,562 | A | 3/1966 | Brown et al. | |
| 3,295,961 | A | 1/1967 | Colombo et al. | |
| 3,311,449 | A | 3/1967 | Atsukawa et al. | |
| 3,383,166 | A | 5/1968 | Gerry et al. | |
| 3,574,537 | A | 4/1971 | Tsai | |
| 3,855,401 | A | 12/1974 | Aiso et al. | |
| 3,862,293 | A | 1/1975 | Maurel et al. | |
| 3,983,212 | A | 9/1976 | Lowenstein et al. | |
| 4,006,215 | A | 2/1977 | Hall et al. | |
| 4,110,399 | A | 8/1978 | Gaudernack et al. | |
| 4,119,698 | A | 10/1978 | Zimmer et al. | 423/82 |
| 4,124,680 | A | 11/1978 | Cohen et al. | 423/126 |
| 4,126,663 | A | 11/1978 | Pitts | 423/63 |
| 4,224,287 | A | 9/1980 | Ziegenbalg et al. | 423/112 |
| 4,237,102 | A | 12/1980 | Cohen et al. | 423/126 |
| 4,239,735 | A | 12/1980 | Eisele et al. | 423/126 |
| 4,244,928 | A | 1/1981 | Ziegenbalg et al. | 423/123 |
| 4,331,636 | A | 5/1982 | Svoronos | 423/126 |
| 4,366,129 | A | 12/1982 | Czeglédi et al. | 423/126 |
| 4,474,736 | A | 10/1984 | Andrews et al. | 423/122 |
| 4,526,763 | A | 7/1985 | Bartlett et al. | 423/112 |
| 4,530,819 | A | 7/1985 | Czeglédi et al. | 423/112 |
| 4,560,541 | A | 12/1985 | Davis | 423/126 |
| 4,634,581 | A | 1/1987 | Cambridge et al. | 423/126 |
| 4,954,168 | A | 9/1990 | Crnojevich et al. | 423/55 |
| 5,019,360 | A | 5/1991 | Lehto | 423/132 |
| 5,352,419 | A | 10/1994 | Jenkins | 423/126 |
| 5,558,847 | A | 9/1996 | Kaaber et al. | 423/111 |
| 6,110,434 | A | 8/2000 | Pickens et al. | 423/132 |
| 6,248,302 | B1 * | 6/2001 | Barnett et al. | 423/83 |

FOREIGN PATENT DOCUMENTS

| | | |
|---|---|---|
| CA | 584380 | 10/1959 |
| DE | 1179919 | 10/1964 |
| DE | 2653762 | 6/1978 |
| DE | 2803483 | 8/1979 |
| DE | 2906646 | 10/1979 |
| DE | 2849555 | 12/1979 |
| DE | 151633 | 10/1981 |
| DE | 3713679 | 12/1987 |
| DE | 281583 | 8/1990 |
| FI | 21420 | 10/1946 |
| FR | 574983 | 4/1924 |
| FR | 1234444 | 10/1960 |
| FR | 1558347 | 10/1960 |
| FR | 2360515 | 3/1978 |
| FR | 2495954 | 6/1982 |
| GB | 272748 | 6/1927 |
| GB | 356523 | 9/1931 |
| GB | 857245 | 12/1960 |
| GB | 883311 | 11/1961 |
| GB | 2000751 | 1/1979 |
| GB | 1596484 | 8/1981 |
| GB | 119924 | 10/1981 |
| GB | 1601882 | 11/1981 |
| GB | 2083450 | 3/1982 |
| GB | 2167396 | 5/1986 |
| JP | 50-105539 | 8/1975 |
| JP | 50-105596 | 8/1975 |
| JP | 54-137499 | 10/1979 |
| NL | 7216006 | 5/1973 |
| SU | 190360 | 11/1966 |
| SU | 272182 | 1/1970 |
| SU | 569538 | 9/1977 |
| SU | 872456 | 10/1981 |
| SU | 1161467 | 6/1985 |
| SU | 1258815 | 9/1986 |
| WO | 85/00799 | 2/1985 |

* cited by examiner

PROCESS FOR TREATING ALUMINA-BEARING ORES TO RECOVER METAL VALUES THEREFROM

CROSS REFERENCE TO RELATED APPLICATIONS

This application is a continuation-in-part of U.S. Ser. No. 09/497,909, filed Feb. 4, 2000 now U.S. Pat. No. 6,248,302.

BACKGROUND OF THE INVENTION

This invention relates to alumina-bearing ores such as bauxite, and more particularly, it relates to a process for treating alumina-bearing ores to recover the metal values therein.

The Bayer process is used for recovering substantially pure alumina from bauxite and uses NaOH to dissolve the alumina in the bauxite. Most of the other components of the bauxite are inert in the process, except silica, some of which reacts with the hydroxide. The inert components and the silica and silica compounds are rejected and are referred to as red mud or red sludge. This waste product from the Bayer process has presented serious disposal problems. Red mud can contain 11 to 45 wt. % $Al_2O_3$, 5 to 66 wt. % $Fe_2O_3$, 1 to 16 wt. % $SiO_2$, 6 to 17 wt. % $TiO_2$ and 3 to 8 wt. % $Na_2O$.

Many attempts have been made to recover the metal values from red mud. For example, U.S. Pat. No. 3,574,537 discloses a process for the treatment of red-mud to extract $Fe_2O_3$, $Al_2O_3$, $SiO_2$ and $Na_2O$, in which $SO_2$ is passed into a solution of red-mud and the $Fe_2O_3$ separated therefrom. The liquor is heated until a pH of 4.5 to 5.0 is reached forming a precipitate of $SiO_2$ and $Al(OH)SO_3$. The precipitate is separated from the liquor which is concentrated to crystallize out $Na_2SO_3$. Sulphuric acid is added to the separated precipitate forming water-soluble aluminum salts. $SiO_2$ remains as a residue and is removed from solution. Water and a potassium or ammonium salt is added to the liquor from which the corresponding alum may be crystallized out.

U.S. Pat. No. 4,119,698 discloses that red mud is digested with concentrated sulfuric acid or with sulfur trioxide gas to produce sulfates that can be leached out to the resulting mass with water. The solution is then heated at a pH of 1 to precipitate titanium oxide hydrate by hydrolysis. The remaining sulfates of the solution are then obtained in solid form by evaporation, or by precipitation with acetone, and the solid is then roasted to convert the aluminum and iron to the oxide. After leaching out the sodium sulfate with water, the aluminum and iron oxide are separated by the Bayer process, which works in this case even though x-ray diffusion patterns show that the aluminum oxide is mainly $\alpha Al_2O_3$.

U.S. Pat. No. 4,017,425 discloses a method for activating the red mud formed in the Bayer alumina producing process for allowing its use as adsorbent, catalyst, ion-exchanging substance and clarifying substance, comprising digesting red mud and dispersing the metal oxide compound particles in the compound of metal hydroxides and silica gel.

U.S. Pat. No. 5,043,077 discloses a method of treating Bayer process red mud slurries to improve or facilitate the handling thereof, comprising adding to such a slurry a minor proportion of humic acids or humates effective to reduce the viscosity of the slurry.

Australian patent 223,794 discloses treating red mud by first calcining then forming a slag in an electric furnace followed by treating the slag with sulfuric acid. Alumina can be recovered from aluminum sulfate by heating.

German Patent 26 53 762 discloses a treatment for red mud which comprises heating to 250° to 350° C. (pref 280° to 320° C.), adding concentrated $H_2SO_4$ or $SO_3$ gas, leaching the sulphates formed with water and separating the solution. Ti oxide is precipitated after adjusting the pH to 1 and the solid Ti oxide is separated by filtering. Acetone is added or the solution is evaporated to crystallize the sulphates which are roasted at 900 to 1000° C. The remaining Na sulphate is leached with water and the oxides of Al and Fe remaining are treated by the Bayer process.

Japanese reference JP54137-499 discloses that silica, titania and alumina can be separated from red mud by adding sulfuric acid and then ammonia, reducing trivalent iron to divalent, and hydrolyzing by adjusting pH.

It will be seen from the above that great effort is expended to recover the values from red mud. Thus, there is still a great need for a process which can extract the metal values from alumina-bearing ores in an economical manner which does not generate red mud. The instant invention provides such a process.

SUMMARY OF THE INVENTION

It is an object of the present invention to provide a process to recover metal values from alumina-bearing ores.

It is another object of the present invention to provide a process for recovering alumina, iron oxide, silica and titania values from alumina-bearing ores.

It is a further object of the present invention to provide an acid process for recovering the metal values from alumina-bearing ores.

It is still a further object of the present invention to provide an acid digesting process for recovering the metal values from alumina-bearing ores in an economical manner.

These and other objects will become apparent from a reading of the specification and claims appended hereto.

In accordance with these objects, there is provided a method for processing alumina-bearing ores to recover iron, aluminum, silicon and titanium metal values therefrom, the method comprising the steps of adding the alumina-bearing ores to a digester containing an acid to provide a mixture of acid and alumina-bearing ores and heating the mixture to dissolve soluble compounds of at least one of iron, aluminum, silicon and titanium to provide a digest containing dissolved salts of the soluble compounds and to provide a gas component. Thereafter, the digest is treated with water to dissolve water soluble salts therein to provide a slurry comprised of a liquid containing water and the dissolved soluble salts and a solid component comprised of silica. The solid component is separated from the liquid and the pH of the liquid is adjusted to form an iron-containing precipitate. The iron-containing precipitate is separated from the liquid to provide an iron-depleted liquid whose pH is adjusted to precipitate aluminum trihydrate which is separated from the iron-depleted liquid to provide an aluminum trihydrate-depleted liquid. The pH of the aluminum trihydrate-depleted liquid may be adjusted to form a precipitate comprised of at least one remaining salt in the aluminum trihydrate-depleted liquid to provide a salt-depleted liquid. The salt precipitate is separated from the salt-depleted liquid thereby recovering the metal values from the alumina-bearing ores.

DETAILED DESCRIPTION OF THE PREFERRED EMBODIMENTS

Figure 1:
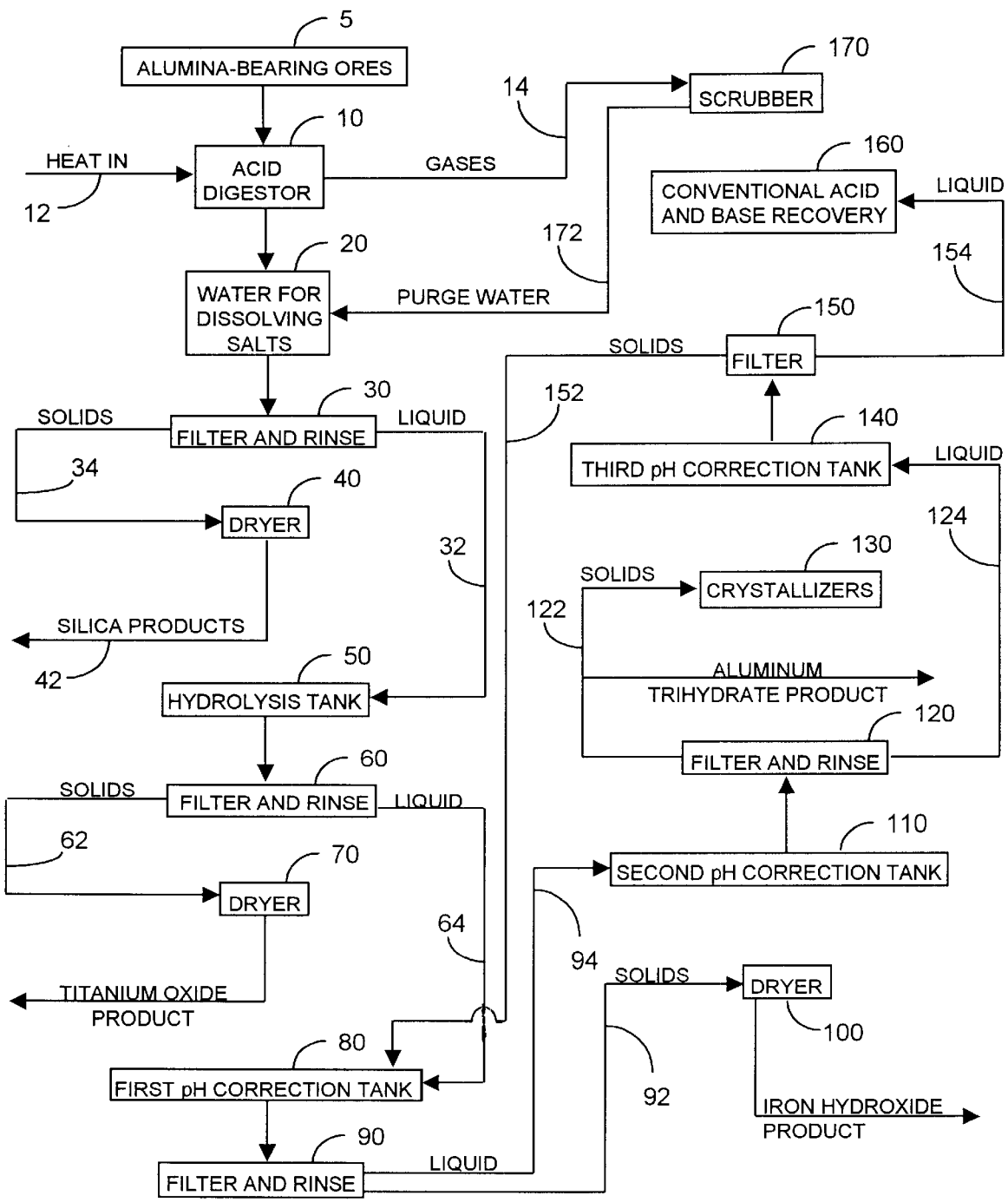
FIG. 1 is a flow diagram showing the process of recovering metal values from alumina-bearing ores in accordance with the invention.

In FIG. 1, there are shown process steps of the present invention for recovering metal values from alumina-bearing ores such as bauxite. It should be understood that the composition of bauxite can vary, depending to some extent on the source of the bauxite. Generally, bauxite can comprise 30 to 60 wt. % $Al_2O_3$, 3 to 23.5 wt. % $Fe_2O_3$, 1.5 to 26.5 wt. % $SiO_2$, 1 to 18 wt. % $TiO_2$ and other minor ingredients. Preferably, free water is removed. That is, it is preferred to use a high solids content for use in the digester. Thus, the alumina-bearing ores for use in the digester can comprise about 25 to 75 wt. % solids or higher, the balance water, with the higher level of solids being preferred.

In the process, alumina-bearing ores 5 is added to an acid digester 10 for providing a mix for purposes of digesting the major components such as soluble compounds of iron, aluminum, and titanium. Minor components will also be digested.

The preferred acid used in the digester is concentrated sulfuric acid (e.g., approximately 93% by weight). However, other strong acids such as $HClO_4$, HCl, $HNO_3$ and $H_3(PO_4)$ may be used singly or in combination with $H_2SO_4$ acid, for example. The different acids may produce different salts, however, the process may be adjusted to accommodate the different materials.

Preferably, alumina-bearing ores, e.g., bauxite, is added to the digester to provide a concentration which is just in excess of a stoichiometric ratio. The ratio can range from about 0.8 to 2, preferably about 1 to 1.1. For example, the alumina-bearing ores can be added to provide about 2831 lbs of $H_2SO_4$ to 2000 lbs of alumina-bearing ores and preferably 2973 lbs of $H_2SO_4$ to 2000 lbs of alumina-bearing ores, depending to some extent on the composition of the alumina-bearing ores or bauxite. The amount of acid provided in the mix is that which is effective in digesting the alumina-bearing ores efficiently.

In the preferred embodiment, digester 10 is maintained at an elevated temperature, for example, up to 300° C. and typically in the range of about 160° to 200° C., e.g., about 180° C. Heat is added along line 12. The ranges provided herein are inclusive of the numbers within the range as if specifically set forth. Gases generated can be removed along line 14 on a continuous basis and directed to a scrubber 170. For purposes of removing gases, preferably the digester is maintained at a slight negative pressure to remove gases such as $SO_2$, $SO_3$, $H_2O$ and $CO_2$.

The period of time for digesting an alumina-bearing ore such as bauxite with acid or time for contacting with acid can range from 15 to 90 minutes or even longer with longer times not known to be detrimental. Shorter times can be employed, especially at the higher temperatures. If a continuous feeder is employed, then the feed rate is controlled to permit a retention time for digesting, e.g., 15 to 90 minutes or longer as suitable.

When sulfuric acid is employed in digester 10, the principle metals in the alumina-bearing ores (aluminum, iron, titanium, sodium and calcium) are converted to sulfates. Another acid that could be used is hydrochloric acid which would convert the principle metals to chlorides.

After the digesting step, the digested mix is treated with water 20 for purposes of recovering water soluble sulfates from the mix. The treatment can be at room temperature but preferably is carried out at about 80° to 100° C. to promote dissolution of the water soluble salts. Preferably, the water used for purposes of dissolution is maintained acidic, e.g., about a pH in the range of 1 to 2. The soluble sulfates are leached from the digested mix with water 20 to provide a liquid comprised of water containing soluble salts and solids. In a preferred operation, the water for the leaching step includes the water from scrubber 170. By using water from scrubber 170, acids used in the process are recovered. The use of water from scrubber 170 eliminates the need to dispose of a waste stream and provides for more favorable economics in the process. The amount of water added depends on the concentration of soluble salts, but generally water is added to maintain about 5 to 25% salts in solution.

The solids that remain after digesting and leaching of the soluble salts are comprised of silica. As will be seen from FIG. 1, the silica and any other solids remaining, e.g., trace amounts of aluminum and iron, are separated from the liquid by filtration 30. The silica solids can be rinsed with water to recover any residual salts. The solids may be removed along line 34 and dried by dryer 40 before being removed from the system as a first product 42. The silica can be used in the cement industry or may be disposed of as backfill without presenting environmental problems.

The liquid resulting after the digesting step and the leaching step may be subjected to a hydrolysis step 50. This step is optional and is only necessary if titanium is present in the alumina-bearing ores in substantial amounts, e.g., greater than 3%. Thus, it will be seen from FIG. 1 that the liquid resulting from the filtration step is removed along line 32 to a hydrolysis tank where sufficient water is added to form a titanium oxide precipitate. For purposes of precipitating titanium oxide, the solution should be maintained at a pH of about 1 to 1.5 and a temperature of 90° to 95° C. for about two hours.

After the titanium oxide precipitate is formed, the precipitate is separated by filtration, leaving a titanium-depleted solution. The precipitate may be rinsed several times to remove residual liquid and the rinse water added to the titanium-depleted solution. The pH of the titanium-depleted liquid is acidic, e.g., in the range of 1 to 1.5. The titanium oxide precipitate is removed along line 62 and heated in a dryer 70 which removes the water of hydration thereby forming titanium oxide. This is the second useful product which may be recovered from the alumina-bearing ores.

The titanium-depleted liquid is removed along line 64 to a first pH correction tank 80 (see FIG. 1). The pH is adjusted upwardly to a pH sufficiently high to form an aluminate, e.g., sodium aluminate and to form a precipitate containing iron such as $Fe(OH)_2$ or $Fe(OH)_3$. Generally, the pH for forming sodium aluminate and precipitating iron compounds is in the range of about 11 to 13. The pH can be adjusted upwardly by adding sodium hydroxide in which case sodium aluminate and iron hydroxide are formed. However, the pH may be adjusted upwardly by addition of any suitable alkali or alkaline earth compound such as an hydroxide which forms a suitable compound such as aluminate, e.g., sodium aluminate and a precipitate of iron hydroxide which can be readily removed from the aluminate-containing solution. As the pH is increased, typically the iron hydroxide forms in a pH range of about 3 to 6, and typically the sodium aluminate forms in a pH range of about 11 to 13.

The iron hydroxide can be removed by filtration 90, as shown in FIG. 1, to provide an iron hydroxide-depleted solution. Typically, upon removal, the iron hydroxide precipitate is washed several times to remove residual sodium sulfate and sodium aluminate. The wash water from the iron hydroxide precipitate is returned to the iron hydroxide-depleted solution. It should be noted that precipitation of other elements which are present in minor amounts may occur. The iron hydroxide is removed along line 92 to be dried in drying step 100, as shown in FIG. 1, and recovered as the third useful product from the alumina-bearing ore.

The iron hydroxide-depleted solution, removed along 94, is subjected to a further pH adjustment 110, as shown in FIG. 1. That is, the pH is lowered sufficiently to form alumina trihydrate precipitate, i.e., alumina trihydrate crystals. This provides a slurry of alumina trihydrate crystals and water. Alumina trihydrate as used herein is meant to include $Al_2O_3 \cdot 3H_2O$ or $Al(OH)_3$ and may be referred to as aluminum hydroxide, aluminum hydrate, aluminum trihydrate, hydrated alumina or hydrated aluminum oxide. For purposes of forming alumina trihydrate, the pH of the iron-depleted solution is lowered to a pH in the range of about 11 to 12, preferably pH in the range of 11.3 to 11.8. The pH can be lowered by the addition of an acid. Preferably, the acid is selected from the group comprising $H_2SO_4$, HCl, $HNO_3$, $H_2SO_3$, $H_3(PO_4)$ or combinations of such as acids with $H_2SO_4$ acid being preferred. A 10 to 20 wt. % $H_2SO_4$ solution can be used for purposes of lowering the pH. Acid may have to be added several times until the pH stabilizes between 11.3 to 11.8. That is, after the addition of acid, the pH may rise again and require further additions.

The slurry of alumina trihydrate crystals and liquid are filtered, step 120, to separate the crystals from the liquid. The crystals may be washed or rinsed several times to remove residual liquid containing soluble salts to ensure high purity alumina trihydrate crystals. The wash water can be returned to the residual liquid. The alumina trihydrate crystals may be dried and sold as a fourth product recovered from the alumina-bearing ores. Or, the alumina trihydrate crystals may be forwarded along line 122 to the crystalizers 130 similar to or the same as used in the Bayer process. Of the alumina trihydrate crystals formed, 95% have a particle size in the range of 30 to 50 $\mu$m with the remainder having a size less than 30 $\mu$m. However, the crystal size can be larger or smaller, depending to some extent on the time and temperature and acid used for precipitation. Typically, the alumina trihydrate crystals will have $Na_2O$ content in the range of 0.05 to 0.15 wt. %. Further, the crystals are substantially free of organic compounds and only contain traces of calcium, e.g., less than 0.01 wt. % and less than 0.005 wt. % Fe.

One of the last operations in obtaining alumina is calcination. In this operation, the temperature of the alumina trihydrate is raised sufficiently to effect the following reaction: $2Al(OH)_3 \rightarrow Al_2O_3 + 3H_2O$. If the temperature of the reaction is approximately 1100° C., alumina obtained is mostly $\alpha$phase. However, lower temperatures produce a less $\alpha$-phase.

The alumina trihydrate of the invention is particularly suited for producing aluminum by electrolysis or for producing activated aluminas because of the high level of purity, e.g., less than 0.1 wt. % $Na_2O$ and substantially free of organics and iron oxide. In producing activated alumina, the alumina trihydrate can be ground to the desired particle size, e.g., 0.1 to 50 $\mu$m before or after activation. Flash calcination or fast dehydration of the alumina trihydrate can occur either by vacuum or by exposure to high temperature gas (780°–1000° C.) for a few seconds. This material may then be used for forming rehydrated agglomerations or bodies of activated alumina using a rotating pan or the oil-drop method. The bodies are activated by heating to 400°–500° C. and can provide surface areas of 250 to 450 $m^2/g$.

It will be appreciated that barium aluminate can be produced in this process by using barium hydroxide to adjust the titanium-depleted liquid upwardly to a pH of about 11 to 13 instead of sodium hydroxide.

The residual liquid separated from the alumina trihydrate crystals can be removed along line 124 or can be further treated to recover remaining salts. That is, the pH of the residual liquid is further lowered in step 140 to precipitate out the remaining dissolved salts. The pH is preferably lowered to a pH in the range of about 6 to 7. This pH range may be obtained with the addition of an acid such as $H_2SO_4$, HCl, $HNO_3$, $H_2SO_3$ and $H_3(PO_4)$ with $H_2SO_4$ acid being preferred. The solids are removed by filtering. Such solids may be washed as desired. Preferably, the solids recovered are returned along line 152 and added to the titanium-depleted liquid at step 80 for reprocessing. The liquid remaining is forwarded long line 154 to step 160 and subjected to acid and base recovery operations. Thus, substantially all of the ingredients are re-used.

In the acid-base recovery process, the solution can be processed in several ways. When sulfuric acid is used for digesting, the liquid directed to step 160 is high purity sodium sulfate (about 99.9%). Thus, the solution can be crystallized or extracted with 1:1 methanol and sodium sulfate recovered. Or the solution can be subject to electrolysis to form ammonium sulfate and sodium hydroxide. The ammonium sulfate may be converted to ammonia and sulfuric acid by heating at 400° to 500° C. Depending on which products are produced, they may be sold or reused in the process to improve efficiency.

The process may be adjusted as needed to suit the bauxite being used for highest efficiency. For example, alumina removal efficiency can be as high as 97% and no red mud is produced. High efficiency for the Bayer process is about 89%; however, as noted, the Bayer process produces red mud residue.

It should be noted that digestion of alumina-bearing ores with sulfuric acid in digester 10 will liberate gases such as $SO_2$, $SO_3$ and $CO_2$. These gases can be removed along line 14 to scrubber 170 where the gas is converted to $Na_2SO_4$ and $Na_2CO_3$ which may be redirected along with water along line 172 to step 20 and used for leaching the water soluble salts from the digest. This eliminates a waste stream in the overall process.

An alternate method may be employed for treating the titanium-depleted liquid removed along line 64 (FIG. 1), depending on the amount of sodium oxide contained therein. If the titanium-depleted solution contains less than about one (1) wt. % sodium oxide, the titanium-depleted solution may be evaporated to crystallize the aluminum sulfate and iron sulfate component contained in the solution. After evaporation, the aluminum sulfate and iron sulfate component is heated to a temperature of about 400° to 600° C. In this temperature range, the iron sulfate is decomposed to iron oxide and sulfur dioxide and sulfur trioxide gas. The sulfur dioxide and sulfur trioxide may be recovered in an oleum scrubber such as scrubber 170 as sulfuric acid for re-use in the process.

The aluminum sulfate is not decomposed in the temperature range of 400° to 600° C. and thus may be washed or separated from the iron oxide. That is, water is used to dissolve the aluminum sulfate from the iron oxide. Preferably, water at temperature in the range of about 60° to 100° C. is used to dissolve the aluminum sulfate. It is preferred to maintain the aluminum sulfate in solution at a high concentration, e.g., 60 to 80 wt. %. Thus, in dissolving aluminum sulfate from the iron oxide, the amount of water used should be minimized to maintain a high concentration of aluminum sulfate in solution. Thereafter, the aluminum sulfate solution is chilled to a temperature range of about 0 to 15° C. which crystallizes out a portion of the aluminum sulfate leaving about 28 to 35 wt. % aluminum sulfate in solution. The crystallized aluminum sulfate is recovered from the solution and heated, e.g., to about 700° to 850° C. This decomposes the aluminum sulfate crystals into alumina and releases sulfur dioxide and sulfur trioxide which may be captured in the oleum scrubber as sulfuric acid for re-use in the process. The alumina is recovered and used without further modification.

When the digest residue or alumina-containing ore contains more than about 1 wt. % sodium oxide, it should be noted that the liquid leaving filter 150 (FIG. 1) is very high in sodium sulfate. This liquid or sodium sulfate solution may be treated or reacted with barium hydroxide at about stoichiometric or slightly less. This reaction forms barium sulfate which precipitates leaving sodium hydroxide in solution. The barium sulfate is removed from the sodium hydroxide solution which can be re-used in the process. The barium sulfate can be heated to a temperature range of 1450° to 1570° C. and decomposed to form barium oxide, sulfur dioxide and sulfur trioxide gases. The sulfur-containing gases can be converted to sulfuric acid in oleum scrubber 170 and re-used in the process. The barium oxide can be dissolved in warn water, e.g., 60° to 90° C., to form barium hydroxide which can be re-used in the process.

Alternatively, the barium sulfate may be mixed with silica and reacted to form a mixture containing barium silicate. The mixture can be heated to about 1250° to 1350° C. to liberate sulfur dioxide and sulfur trioxide which are recovered in scrubber 170. The remainder of the mixture is added to hot water as noted to produce barium hydroxide and silica. The silica can be recovered and sold and the barium hydroxide re-used in the process.

While the process of the invention has been described with respect to alumina-bearing ores or bauxite, it has application to other alumina-bearing ores such as alunite, kaolinite, and other kaolin-type ore. Normally, these sources of alumina would be washed to remove clays, etc., prior to processing in accordance with the invention. Typically, for processing in accordance with the invention, the alumina-bearing ores are ground to about less than 16 mesh. Thereafter, the alumina-bearing ores are digested as described herein and has the advantage that no residues such as red mud are produced.

While the invention has been described in terms of preferred embodiments, the claims appended hereto are intended to encompass other embodiments which fall within the spirit of the invention.

What is claimed is:
1. A method for processing alumina-bearing ores to recover iron, aluminum, silicon and titanium metal values therefrom, the method comprising the steps of:
  (a) adding said alumina-bearing ores to a digester containing an acid to provide a mixture of acid and alumina-bearing ores;
  (b) heating said mixture to dissolve soluble compounds of iron, aluminum and titanium to provide a digest containing dissolved salts of said soluble compounds and to provide a gas component;
  (c) treating said digest with water to dissolve water soluble salts therein to provide a slurry comprised of a liquid containing water and said dissolved soluble salts and a solid component comprised of silica;
  (d) separating said solid component from said liquid;
  (e) adjusting the pH of said liquid upwardly to form an iron-containing precipitate;
  (f) separating said iron-containing precipitate from said liquid to provide an iron-depleted liquid;
  (g) adjusting the pH of said iron-depleted liquid to precipitate aluminum trihydrate; and
  (h) separating said aluminum trihydrate from said iron-depleted liquid to provide an aluminum trihydrate-depleted liquid.

2. The method in accordance with claim 1 wherein the acid is selected from the group consisting of $H_2SO_4$, HCl, $HNO_3$, $HClO_4$, and $H_3(PO_4)$ or mixtures thereof.

3. The method in accordance with claim 1 wherein said mixture contains alumina-bearing ores to acid in a ratio of about 0.8 to 2.

4. The method in accordance with claim 1 wherein said heating of said mixture includes heating to a temperature in the range of ambient up to 300° C.

5. The method in accordance with claim 1 including heating of said mixture to a temperature in the range of 160° to 200° C.

6. The method in accordance with claim 1 wherein said mixture is heated for a period in the range of 15 to 90 minutes.

7. The method in accordance with claim 1 including adjusting the pH of the liquid in step (e) upwardly after separating said solid component by adding a base material.

8. The method in accordance with claim 1 including adjusting the pH of said liquid in step (e) upwardly by adding a base material selected from NaOH, $Ca(OH)_2$ and KOH.

9. The method in accordance with claim 1 wherein NaOH is added to adjust the pH of the liquid in step (e) upwardly to form sodium aluminate.

10. The method in accordance with claim 1 including adjusting the pH of the liquid in step (e) to a pH in the range of 3 to 6 to form an iron-containing precipitate.

11. The method in accordance with claim 1 wherein the iron-containing precipitate is iron hydroxide.

12. The method in accordance with claim 1 including adjusting the pH of the iron-depleted liquid to a pH in the range of 11 to 13 to form aluminum trihydrate.

13. The method in accordance with claim 1 including adding an acid to the iron-depleted liquid to adjust said pH to precipitate said aluminum trihydrate.

14. The method in accordance with claim 1 including adding $H_2SO_4$ acid to the iron-depleted liquid to adjust said pH to precipitate said aluminum trihydrate.

15. The method in accordance with claim 1 including adjusting the pH of the aluminum trihydrate-depleted liquid to a pH in the range of about 6 to 7 to precipitate remaining dissolved salts.

16. The method in accordance with claim 1 including adding water to said liquid from step (d) to hydrolyze titanium contained therein to form a titanium containing precipitate.

17. The method in accordance with claim 16 including the step of separating said titanium containing precipitate from said liquid.

18. The method in accordance with claim 1 wherein the alumina-bearing ore is bauxite.

19. The method in accordance with claim 1 including adjusting the pH of the aluminum trihydrate-depleted liquid to form a precipitate comprised of at least one remaining salt in said aluminum trihydrate-depleted liquid to provide a salt-depleted liquid; and separating said salt precipitate from said salt-depleted liquid thereby recovering said metal values from said alumina-bearing ores.

20. The method in accordance with claim 1 including calcining the alumina trihydrate to recover alumina.

21. The method in accordance with claim 1 including calcining the alumina trihydrate and recovering alumina having less than 0.15 wt. % sodium oxide.

22. A method for processing bauxite to recover iron, aluminum, silicon and titanium metal values therefrom, the method comprising the steps of:

(a) adding said bauxite to a digester containing sulfuric acid to provide a mixture of acid and bauxite;

(b) heating said mixture to a temperature in the range of 120° to 200° C. to dissolve soluble compounds of iron, aluminum and titanium to provide a digest containing dissolved salts of said soluble compounds and to provide a gas component, said heating being for a period of about 15 to 90 minutes;

(c) treating said digest with water to dissolve water soluble salts therein to provide a slurry comprised of a liquid containing water and said dissolved soluble salts and a solid component comprised of silica;

(d) separating said solid component from said liquid;

(e) adjusting the pH of said liquid to form an iron-containing precipitate;

(f) separating said iron-containing precipitate from said liquid to provide an iron-depleted liquid;

(g) adjusting the pH of said iron-depleted liquid to a pH range of 11 to 13 to precipitate aluminum trihydrate;

(h) separating said aluminum trihydrate from said iron-depleted liquid to provide an aluminum trihydrate-depleted liquid;

(i) adjusting the pH of the aluminum trihydrate-depleted liquid to a pH range of about 6 to 7 to form a salt precipitate of salts remaining in said aluminum trihydrate-depleted liquid to provide a salt-depleted liquid; and (j) separating said salt precipitate from said salt-depleted liquid thereby recovering said metal values from said bauxite.

* * * * *